United States Patent
Noebel et al.

(10) Patent No.: US 8,596,578 B2
(45) Date of Patent: Dec. 3, 2013

(54) PRESSURE BULKHEAD FOR PURPOSES OF ARRANGEMENT IN AN AIRCRAFT FUSELAGE

(75) Inventors: Torsten Noebel, Neuendeich (DE); Boris Ehrhardt, Hamburg (DE); Diego Quintana-Ruiz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 300 days.

(21) Appl. No.: 13/097,170

(22) Filed: Apr. 29, 2011

(65) Prior Publication Data
US 2011/0290940 A1    Dec. 1, 2011

Related U.S. Application Data

(60) Provisional application No. 61/329,573, filed on Apr. 30, 2010.

(30) Foreign Application Priority Data

Apr. 30, 2010 (DE) .......................... 10 2010 018 933

(51) Int. Cl.
*B64C 1/10* (2006.01)

(52) U.S. Cl.
USPC .............................. 244/121; 244/119; 220/609

(58) Field of Classification Search
USPC .............. 244/119, 121, 129.4; 220/89.1, 592, 220/609; 114/78, 116, 361
See application file for complete search history.

(56) References Cited

U.S. PATENT DOCUMENTS

| | | | | |
|---|---|---|---|---|
| 5,262,220 A | * | 11/1993 | Spriggs et al. | 428/156 |
| 5,899,412 A | * | 5/1999 | Dilorio et al. | 244/119 |
| 6,378,805 B1 | * | 4/2002 | Stephan et al. | 244/119 |
| 6,443,392 B2 | | 9/2002 | Weber | |
| 8,033,503 B2 | * | 10/2011 | Basso | 244/119 |

* cited by examiner

*Primary Examiner* — Rob Swiatek
(74) *Attorney, Agent, or Firm* — Leydig, Voit & Mayer, Ltd.

(57) ABSTRACT

A pressure bulkhead for a fuselage of an aircraft is configured for bounding a fuselage interior relative to an external environment. The pressure bulkhead includes a flat skin configured to span a cross-section of the fuselage and having a cavity disposed at a core region of the skin. The core region is radially bounded by a ring element. A plurality of radial stiffeners extend on the skin and provide stabilization of the skin. Each radial stiffener is fixed at an end to the ring element. A reinforcement element extends over the ring element.

12 Claims, 3 Drawing Sheets

PRESSURE BULKHEAD FOR PURPOSES OF ARRANGEMENT IN AN AIRCRAFT FUSELAGE

CROSS REFERENCE TO RELATED APPLICATIONS

This application claims priority from U.S. Provisional Patent Application No. 61/329,573 filed Apr. 30, 2010 and German Patent Application No. DE 10 2010 018 933.2, filed Apr. 30, 2010, both of which are hereby incorporated by reference herein in their entireties.

FIELD

The invention relates to a pressure bulkhead for purposes of arrangement in a fuselage of an aircraft, in particular of an aeroplane.

BACKGROUND

Pressure bulkheads in aircraft serve to bound an internal cabin and/or a freight compartment relative to the external environment. Conventionally they are arranged in passenger aeroplanes in the vicinity of the cockpit, i.e. in the region of a nose radar antenna, and at the rear, i.e. in the region of the tail unit. Most pressure bulkheads are designed in the shape of a dome with a curved skin. This has the advantage that the skin is loaded solely as a membrane, as a result of which the skin can be designed to be very thin. In particular in pressure bulkheads of fiber-reinforced composite materials, the skin can thus be built up from a very few laminate layers, as a result of which the weight of the pressure bulkhead can be radically reduced. What is disadvantageous, however, is the relatively large installation space required in the longitudinal direction of the aircraft. This amounts to approximately 25% of the radius of the pressure bulkhead. Typical depths for a single aisle aeroplane are some 400 mm to 500 mm.

In addition, metallic pressure bulkheads with a flat skin are known. For purposes of stabilizing the skin these have a multiplicity of stiffeners arranged orthogonally relative to one another. The stiffeners form a multiplicity of intersection regions, which in particular when using a differential form of construction represent weak points in structural mechanics terms. Furthermore, as a result of their orthogonal arrangement relative to one another the stiffeners are not optimally orientated in terms of loading. In particular the accommodation of bending moments is problematical, so that this type of pressure bulkhead has a relatively thick skin and a relatively high number of stiffeners, which not only leads to a high weight, but also to a complex assembly. While it is possible for purposes of optimizing the intersection regions to design the pressure bulkhead as an integral metal form of construction, for example, with a multiplicity of stiffeners milled out of a solid metallic plate, this type of production is very cost intensive.

A flat, or essentially flat, pressure bulkhead with stiffeners oriented optimally in terms of loading is shown, for example, in the application U.S. Pat. No. 6,443,392. The pressure bulkhead has a multiplicity of stiffeners on a skin, extending radially from a central intersection region. For additional stabilization of the skin and also the stiffeners two ring elements are provided, radially spaced apart from one another, which are connected with the stiffeners, or are integrated with the latter in sections. What is problematical in this pressure bulkhead, however, now as before, is the accommodation of bending moments and moreover, the integration of the at least one ring element into the stiffeners, or the integration of the stiffeners into the at least one ring element.

SUMMARY

An aspect of the present invention is to create a pressure bulkhead, which avoids the disadvantages cited above and with a small installation space enables an alignment of the stiffeners that is optimal in terms of loading as well as an optimal accommodation of bending moments.

In an embodiment, the present invention provides a pressure bulkhead for a fuselage of an aircraft configured for bounding a fuselage interior relative to an external environment. The pressure bulkhead includes a flat skin configured to span a cross-section of the fuselage and having a cavity disposed at a core region of the skin. The core region is radially bounded by a ring element. A plurality of radial stiffeners extend on the skin and provide stabilization of the skin. Each radial stiffener is fixed at an end to the ring element. A reinforcement element extends over the ring element.

BRIEF DESCRIPTION OF THE DRAWINGS

Exemplary embodiments of the present invention are schematically shown in the drawings and described in more detail below with respect to the drawings, in which.

In the figures the same design elements are provided with the same reference numbers, wherein where there is a plurality of the same design elements in one figure just one of these elements is provided with a reference number in the interests of clarity.

BRIEF DESCRIPTION OF THE DRAWINGS

Figure 1:
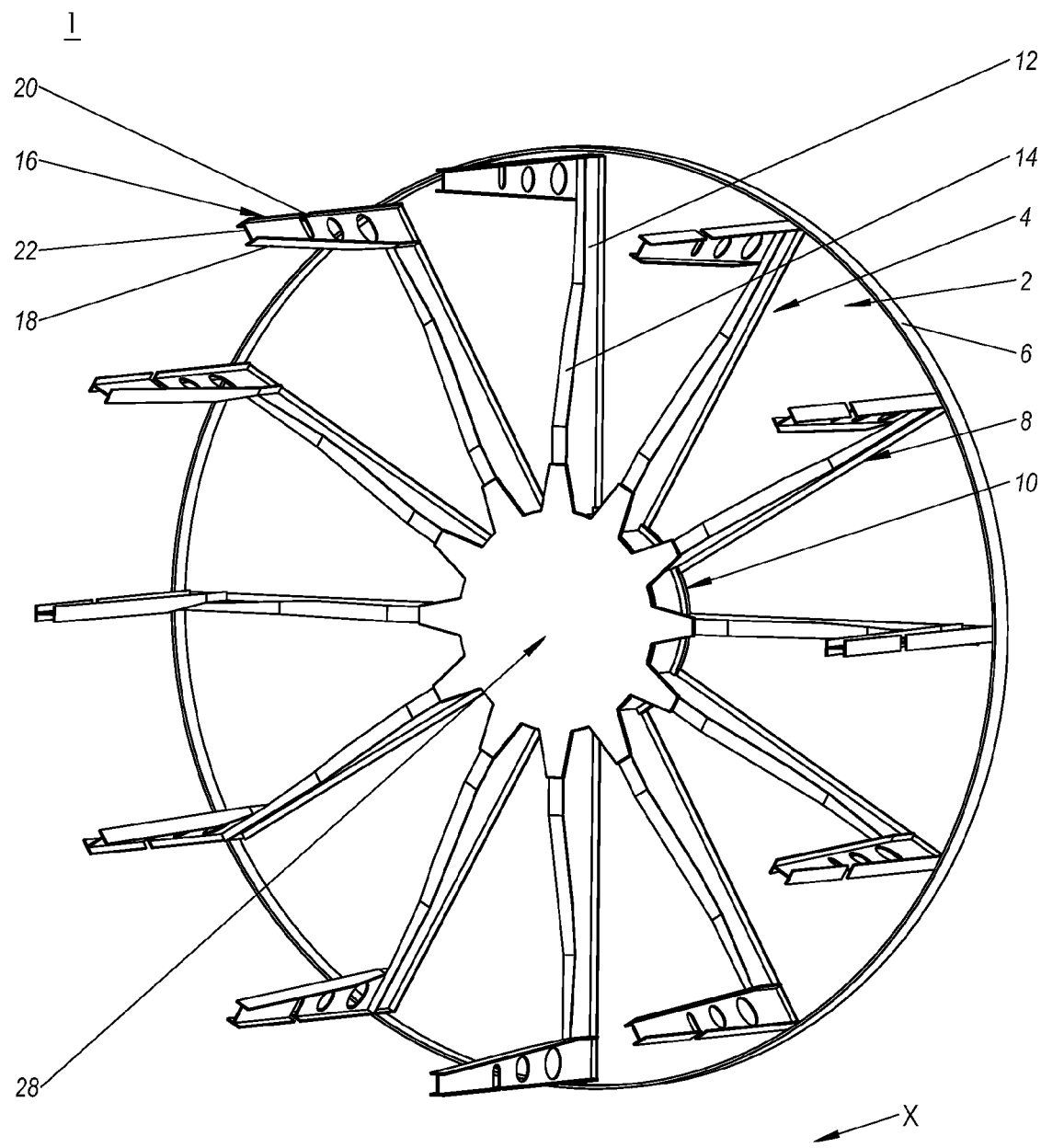
FIG. 1 shows a perspective view of a pressure bulkhead in accordance with an embodiment of the invention.

A pressure bulkhead in accordance with an embodiment of the invention for purposes of arrangement in a fuselage of an aircraft, in particular of an aeroplane, for purposes of bounding a cabin or an interior relative to an external environment, has a flat skin mapping a cross-section of the fuselage, which is stabilized via a multiplicity of radial stiffeners. The skin has a core region formed as a cavity, which is radially bounded by a ring element, with which the stiffeners engage at their ends and over which at least one reinforcement element extends. The flat skin advantageously allows a small installation space. The radial alignment of the stiffeners enables an optimal accommodation or introduction of the loads that occur. The ring element and the reinforcement element extending over the ring element effect in the core region a maximum bending stiffness of the pressure bulkhead in the region in which the loading from bending moments is at its greatest. In combination a plane and thus space-saving pressure bulkhead is thus created that has an optimal alignment of the stiffeners in terms of loading and is extremely stiff in bending. In addition the stiffeners do not form a critical intersection region in structural mechanics terms, which fundamentally simplifies the manufacture and/or assembly of the pressure bulkhead in accordance with the invention.

In a preferred embodiment the cavity is designed with a circular cross-section, which is of benefit to the bending stiffness. Here the cavity can track the outer periphery of the skin, or can have its own geometry that is independent of the outer periphery of the skin.

In one preferred embodiment the reinforcement element is designed as a surface element, which with a skin section bounds the cavity on either side in the axial direction. To increase the stability of the skin the surface element can be designed in a star-shaped manner with a multiplicity of fingers, via which it is connected to the stiffeners. The surface element serves as an additional inner skin and leads to a cell-like or box-like design for the core region, so that the region of the pressure bulkhead, or the skin, in which the loading from bending moments is greatest and the shear loading is least, it is particularly stabilized and stiffened.

To avoid a pressure differential between the cavity and a cabin internal pressure the cavity can still communicate with the cabin in fluid terms in the state in which it is closed off by the surface element. For this purpose in one embodiment the ring element has at least one opening, whereby as a consequence the pressure present in the cabin is also present in the cavity and acts directly on the rear skin and not on the surface element. The reinforcement element can, for example, be designed as bar- or strip-type stiffeners, which extend radially over the ring element and are connected to the latter. Similarly the reinforcement element can be designed as at least one semicircular type of surface element, which simply closes off one region of the cavity in the axial direction. In cases of this kind the ring element can, however, be designed to be closed on its periphery.

The stiffeners can in each case have a cross-section and in particular a height that is optimally matched to the force distributions that are anticipated.

In one embodiment the skin is embodied as a monolithic fiber-reinforced composite component. Similarly the stiffeners and also the ring element can be manufactured from fiber-reinforced composite materials, wherein in one embodiment provision is made that the stiffeners with the ring element are produced as a supporting structure in a fully integral manner in a resin transfer moulding method, and subsequently are adhered to the skin using an adhesive method or a bonding method. However, a differential form of construction is also possible in which, for example, the stiffeners are riveted to the ring element.

The connection of the pressure bulkhead to the fuselage can take place via longitudinal beams, the number of which corresponds to the number of stiffeners and which extend from the ends of the stiffeners. In the case of a monolithic skin these preferably run in the flight direction and extend over at least one frame field, i.e. over two frames. If the skin is constructed as a sandwich structure, the installation direction of the longitudinal beams can also be reversed. In the case of a sandwich form of construction the skin, in particular in the free, non-stabilized surface areas between the stiffeners, can be designed with less material relative to a monolithic skin, since sandwich-type surface areas in principle have a greater stiffness and therefore a greater stability against buckling than monolithic surface areas. Ideally the skin is optimally designed in terms of loading both in the monolithic form of construction and also in the sandwich form of construction. Correspondingly, in one form of embodiment the free surface areas within one form of construction have a greater material thickness than the stabilized surface areas to which the stiffeners are connected. Thus this embodiment has a skin with a varying skin thickness.

The pressure bulkhead in accordance with embodiments of the invention can be loaded such that it can be integrated into a butt joint connection of two fuselage barrels that are to be connected with one another.

In accordance with the representation in FIG. 1 a pressure bulkhead 1 in accordance with an embodiment of the invention for purposes of arrangement in a fuselage of an aircraft, in particular of an aeroplane, for purposes of bounding a cabin in the longitudinal direction, has a flat skin 2 and a supporting structure 4 stabilizing the skin 2

The skin 2 is preferably a monolithic carbon fiber-reinforced composite component with an approximately elliptical outer periphery, onto which is connected an edge 6 extending in the flight direction x. It has preferably a varying material thickness optimized to the loading, but can also be designed with a uniform constant material thickness.

The supporting structure 4 likewise preferably consists of a carbon fiber-reinforced composite material, and has a multiplicity of radially orientated stiffeners 8 as well as a radially inboard ring element 10. The stiffeners 8 extend between the ring element 10 and the edge 6, and are in each case connected with these at their ends. They are evenly distributed over the skin 2 and have in each case an I-shaped cross-section, wherein for purposes of optimization of force distributions their radially outboard body section 12 is stepped down relative to their radial inboard body section 14.

For purposes of connecting the pressure bulkhead 1 to a fuselage section a multiplicity of longitudinal beams 16 are provided, of which one is attached in each case to the radially outboard body section 12 of the stiffener in the region of the edge 6. The longitudinal beams 16 can consist of a fiber-reinforced composite material or a metallic material. They have a wedge-shaped configuration and, in the embodiment shown, are orientated in the flight direction x. Here they have an extent such that they preferably extend over two frame fields, not shown, of the fuselage, i.e. over three frames, and parallel to the latter. The longitudinal beams 16 likewise have an I-shaped cross-section, wherein they correspond to the stiffeners 8 in the connecting region with the stiffeners and have on one side a stepped-down head flange 18. For purposes of passing through the intersecting frames the longitudinal beams have in each case a U-shaped cut-out 20, which extends through their foot flange 22 in the direction of the upper flange 18.

Figure 2:
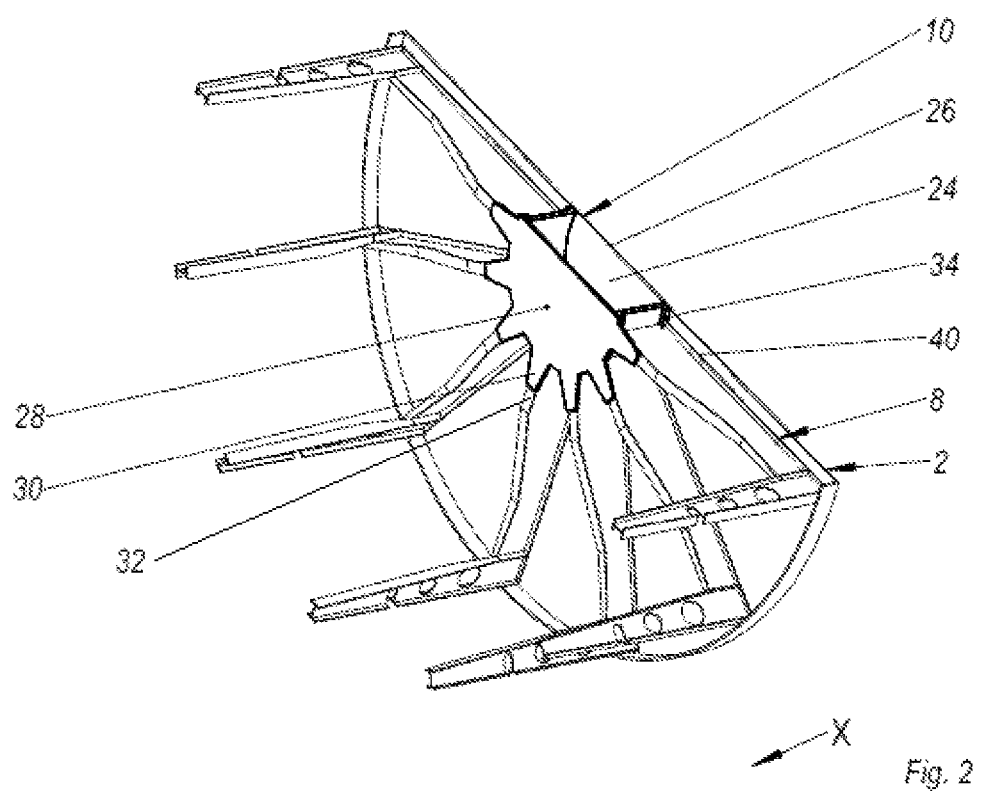
FIG. 2 shows a detailed representation of a core region of the pressure bulkhead from FIG. 1.

In accordance with the cross-sectional representation in FIG. 2, the pressure bulkhead 1 has a core region designed as a concentric and circular cavity 24, which in the radial direction is bounded by the ring element 10, and in the longitudinal direction by a skin section 26 of the skin 2 and also by a plane and star-shaped surface element 28 with a closed surface with a multiplicity of fingers 30. The surface element 28 is preferably also a fiber composite component and with its fingers 30 engages in each case with a head flange section 32 of one of the stiffeners 8. It has preferably a load-optimized varying material thickness, but can also have a uniform constant material thickness, and runs parallel to the skin section 22, as a result of which the core region possesses a box- or cell-type three-dimensional geometry with a rectangular cross-section.

The greatest bending loadings occur in the core region of the skin 2, wherein by means of the cavity 24 that is closed off on its periphery and its faces, and in particular as a result of the surface element 28 serving as a reinforcement element, a cell is created that can be extremely highly loaded in bending. Alongside the material thickness of the skin section 26 and that of the surface element 28, and also their materials per se, the bending stiffness of the cell, i.e. of the core region, and thus that of the pressure bulkhead 1, can be manipulated via the axial distance of the surface element 28 from the skin section 26. Here in principle an increase of the axial distance results in an increase in the bending stiffness. In addition by means of the finger-shaped connection of the surface element 28 to the head flange sections 32 of the stiffeners 8 the load is abstracted from the head flanges and guided over the core region so that radially opposing stiffeners 8 are quasi-coupled with one another.

Figure 3:
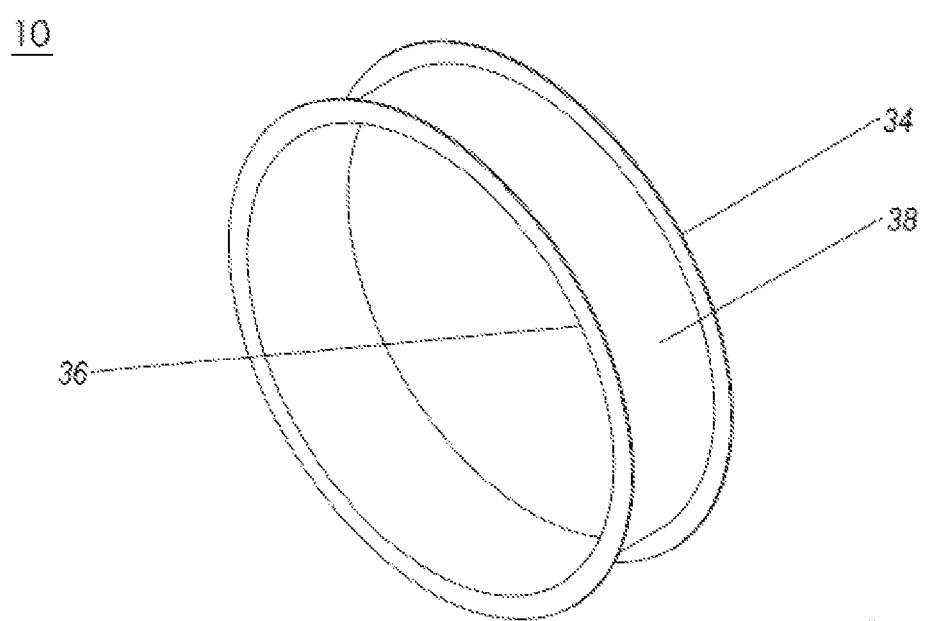
FIG. 3 shows a ring element of the pressure bulkhead from FIG. 1.

In accordance with FIG. 3 the ring element 10 has a C-shaped cross-section with a lower flange 34 at its foot for purposes of connecting to the skin 2, an upper flange 36 for purposes of attachment of the surface element 28, as well as a web 38 extending between the lower flange 34 and the upper flange 36 and closed on its periphery for purposes of bounding the cavity 24 radially. Here the ends of the stiffeners 8 engage with the web 38, and are, as represented in FIG. 2, guided with their foot flange 40 over the lower flange 34 of the ring element 10.

Figure 4:
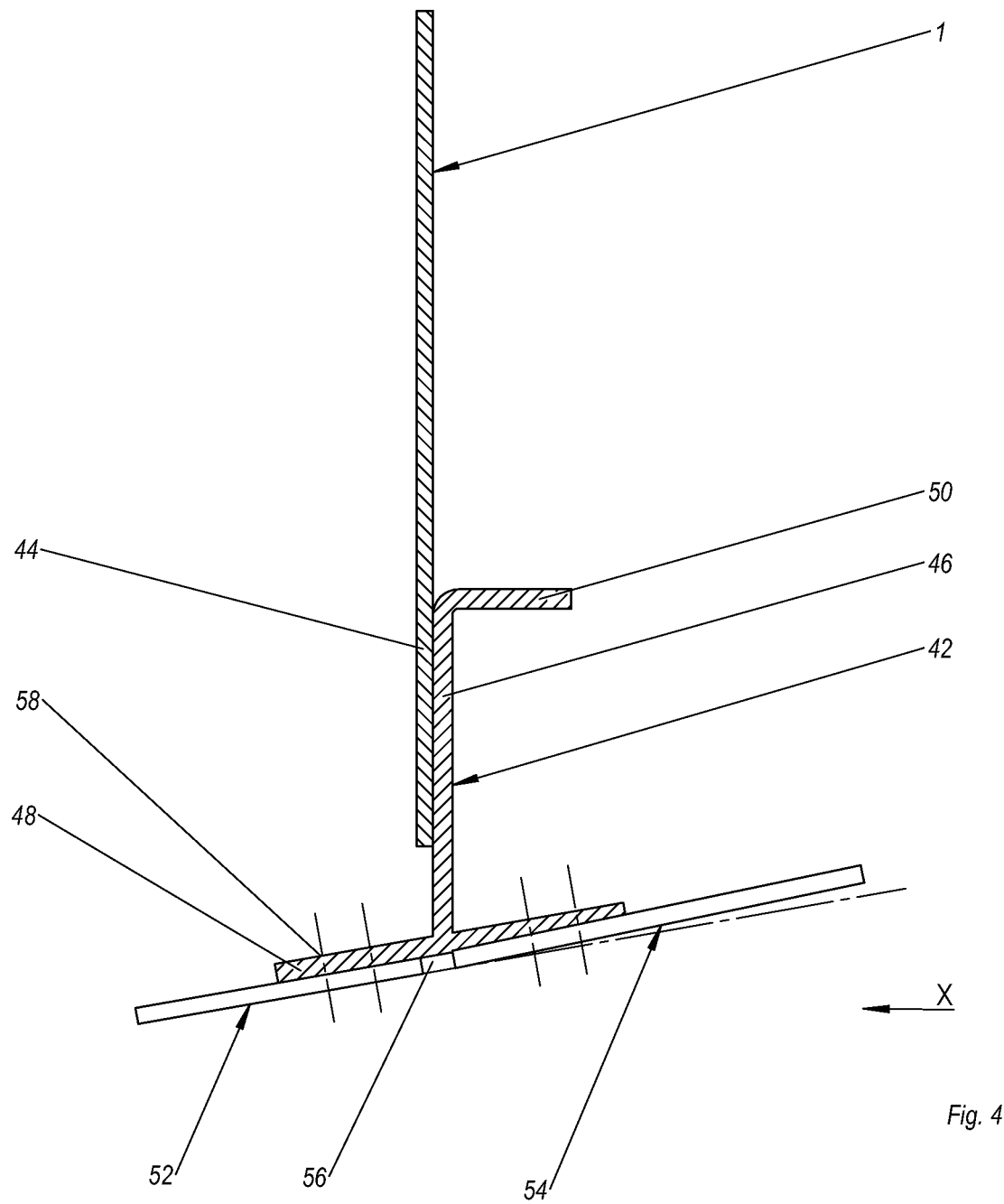
FIG. 4 shows an integration of the pressure bulkhead from FIG. 1 into a butt joint connection.

In accordance with the representation in FIG. 4 the connection of the pressure bulkhead 1 to the fuselage, in addition to the longitudinal beams 16, not shown here, takes place via a peripheral pressure frame 42 arranged in the fuselage. Here a peripheral edge surface section 44 of the skin 2 is connected with a web 46 of the pressure frame 42. The web 46 extends approximately centrally from an outer flange 48 at its foot and opens out at its head into an inner flange 50, which is orientated in the opposite direction to the flight direction x. The pressure frame 42 at the same time takes on the function of a butt joint plate for purposes of connecting two fuselage barrels 52, 54, which are spaced apart from one another by an axial gap 56 that is to be closed. The fuselage barrels 52, 54 are connected with one another via the outer flange 48 of the pressure frame 42, wherein the web 46 is arranged in the region of the axial gap 56. The joining of the pressure frame 42 to the fuselage barrels 52, 54 takes place preferably via mechanical connecting elements such as rivets, 58, which are guided through the outer flange 48 and the fuselage sections 52, 54, and whose positions are indicated by the dashed lines.

In one preferred method the supporting structure 4 is firstly integrally produced in a resin transfer moulding method, and subsequently is adhered to the separately manufactured skin 2 in an adhesive method.

The profiles of the supporting structure 4 are not limited to the exemplary I-sections or C-sections. Further cross-sections, such as J-, E- or Z-sections are likewise conceivable. Similarly, for example, varying profiles (cross-section and material thickness) are conceivable over the length of the stiffeners 8. In principle, the cross-sections and the material thicknesses of the stiffeners 8, of the ring element 10, of the longitudinal beams 16, and also the other elements of the pressure bulkhead 1, such as the skin 2 and surface element 28 are designed in a manner that is optimized for loading and weight.

Thus, in an embodiment, the present invention provides a plane pressure bulkhead for purposes of arrangement in a fuselage of an aircraft, in particular an aeroplane with a skin mapping a cross-section of the fuselage, and with stiffeners extending on the skin for purposes of stabilization of the same, wherein the stiffeners extend radially from a ring element bounding a core region of the skin designed as a cavity, over which ring element at least one reinforcement element extends.

REFERENCE SYMBOL LIST

1 Pressure bulkhead
2 Skin
4 Supporting structure
6 Edge
8 Stiffeners
10 Ring element
12 Outboard body section
14 Inboard body section
16 Longitudinal beam
18 Head flange
20 Cut-out
22 Foot flange
24 Cavity
26 Skin section
28 Surface element
30 Finger
32 Head flange section
34 Lower flange
36 Upper flange
38 Web
40 Foot flange
42 Pressure frame
44 Surface section
46 Web
48 Outer flange
50 Inner flange
52 Fuselage barrel
54 Fuselage barrel
56 Axial gap
58 Rivet
x Flight direction

What is claimed is:

1. A pressure bulkhead for a fuselage of an aircraft configured for bounding a fuselage interior relative to an external environment, the pressure bulkhead comprising:
   a flat skin configured to span a cross-section of the fuselage and including a cavity disposed at a core region of the skin, the core region being radially bounded by a ring element;
   a plurality of radial stiffeners extending on the skin and providing stabilization of the skin, each radial stiffener being fixed at an end to the ring element; and
   at least one reinforcement element extending over the ring element, wherein the at least one reinforcement element forms a surface element and the cavity is bounded in an axial direction by a skin section and by the at least one reinforcement element, and wherein the at least one reinforcement element includes fingers that engage the radial stiffeners.

2. The pressure bulkhead recited in claim 1, wherein the aircraft is an aeroplane.

3. The pressure bulkhead recited in claim 1, wherein the cavity has a circular cross-section.

4. The pressure bulkhead recited in claim 1, wherein the cavity is configured to be in fluid communication with the fuselage interior so as to provide pressure relief to the cavity of any pressure loading relative to the fuselage interior.

5. The pressure bulkhead recited in claim 1, wherein a height of the radial stiffeners is configured to match an anticipated force distribution.

6. The pressure bulkhead recited in claim 1, wherein an end of each radial stiffener is attached to a respective longitudinal beam, the longitudinal beams being configured to connect with the fuselage.

7. The pressure bulkhead recited in claim 6, wherein the longitudinal beams have a length configured to correspond to at least one frame field of the aircraft.

8. The pressure bulkhead recited in claim 1, wherein the skin includes a peripheral surface section configured for connection with a pressure frame.

9. The pressure bulkhead recited in claim 1, wherein the skin is monolithic.

10. The pressure bulkhead recited in claim 1, wherein the pressure bulkhead is configured to be integrated into a butt joint connection between two fuselage barrels that are configured to be joined together.

11. A pressure bulkhead for a fuselage of an aircraft configured for bounding a fuselage interior relative to an external environment, the pressure bulkhead comprising:
   a flat skin configured to span a cross-section of the fuselage and including a cavity disposed at a core region of the skin, the core region being radially bounded by a ring element;
   a plurality of radial stiffeners extending on the skin and providing stabilization of the skin, each radial stiffener being fixed at a first end to the ring element and attached at a second end to a respective longitudinal beam, the longitudinal beams being configured to connect with the fuselage; and
   at least one reinforcement element extending over the ring element.

12. The pressure bulkhead recited in claim 11, wherein the longitudinal beams have a length configured to correspond to at least one frame field of the aircraft.

* * * * *